June 25, 1968  H. E. ALDEN  3,389,436
MACHINES FOR MAKING SWABS WITH COTTON TIPS
Filed July 21, 1964  6 Sheets-Sheet 1

INVENTOR.
HARRY E. ALDEN
BY
Arnold J. Worfolk
ATTORNEY

June 25, 1968 H. E. ALDEN 3,389,436
MACHINES FOR MAKING SWABS WITH COTTON TIPS
Filed July 21, 1964 6 Sheets-Sheet 3
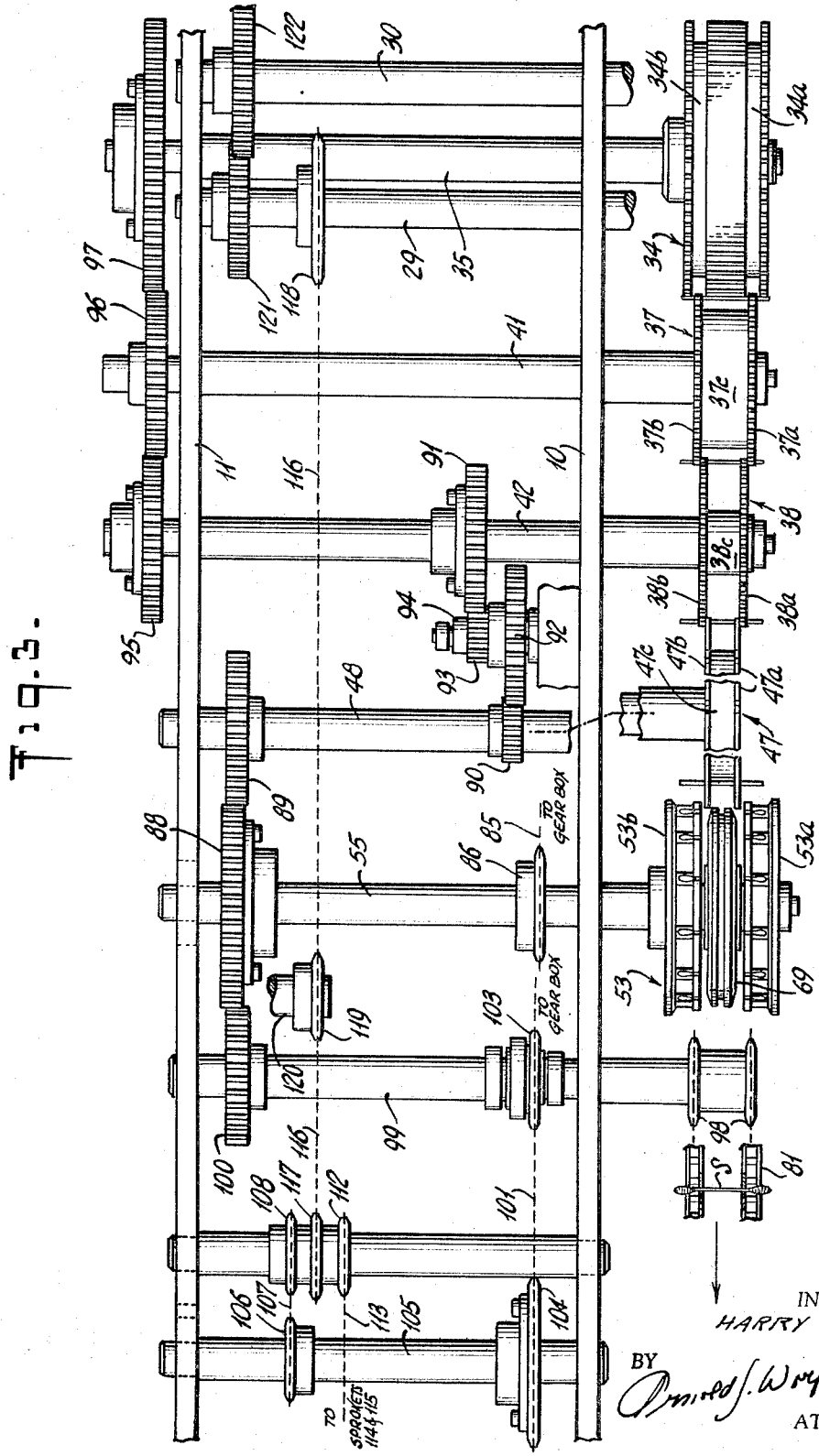
INVENTOR.
HARRY E. ALDEN
BY
ATTORNEY

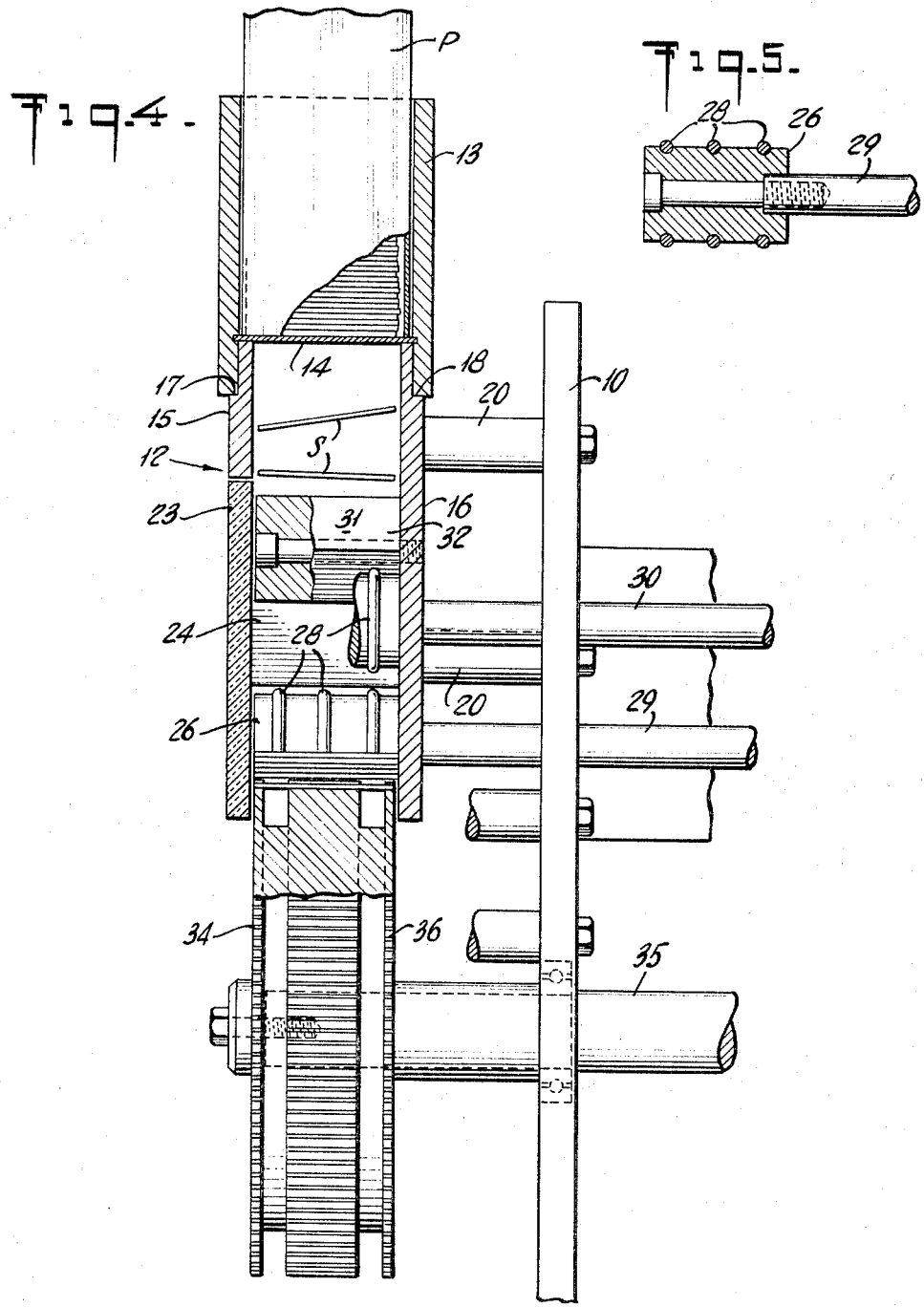

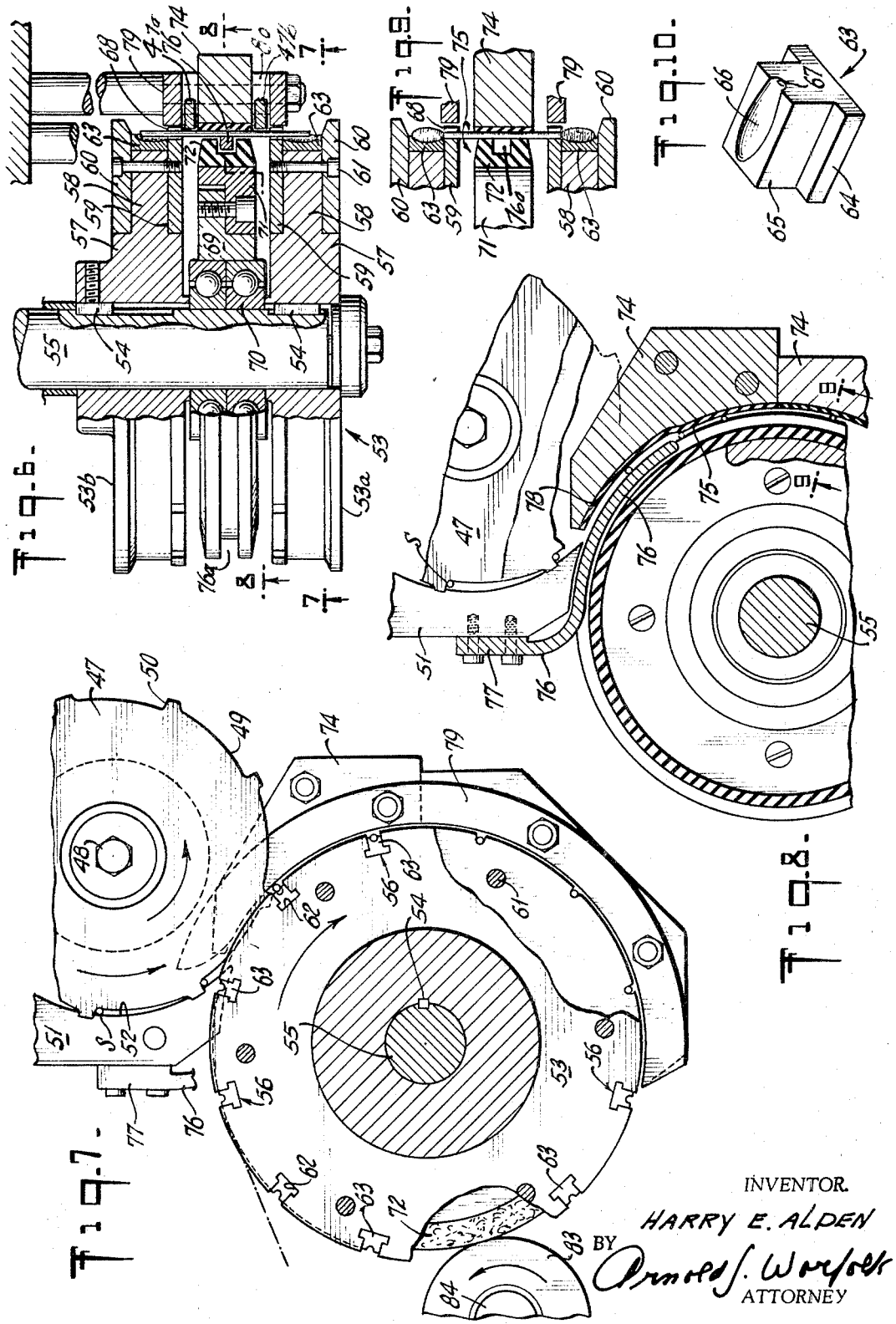

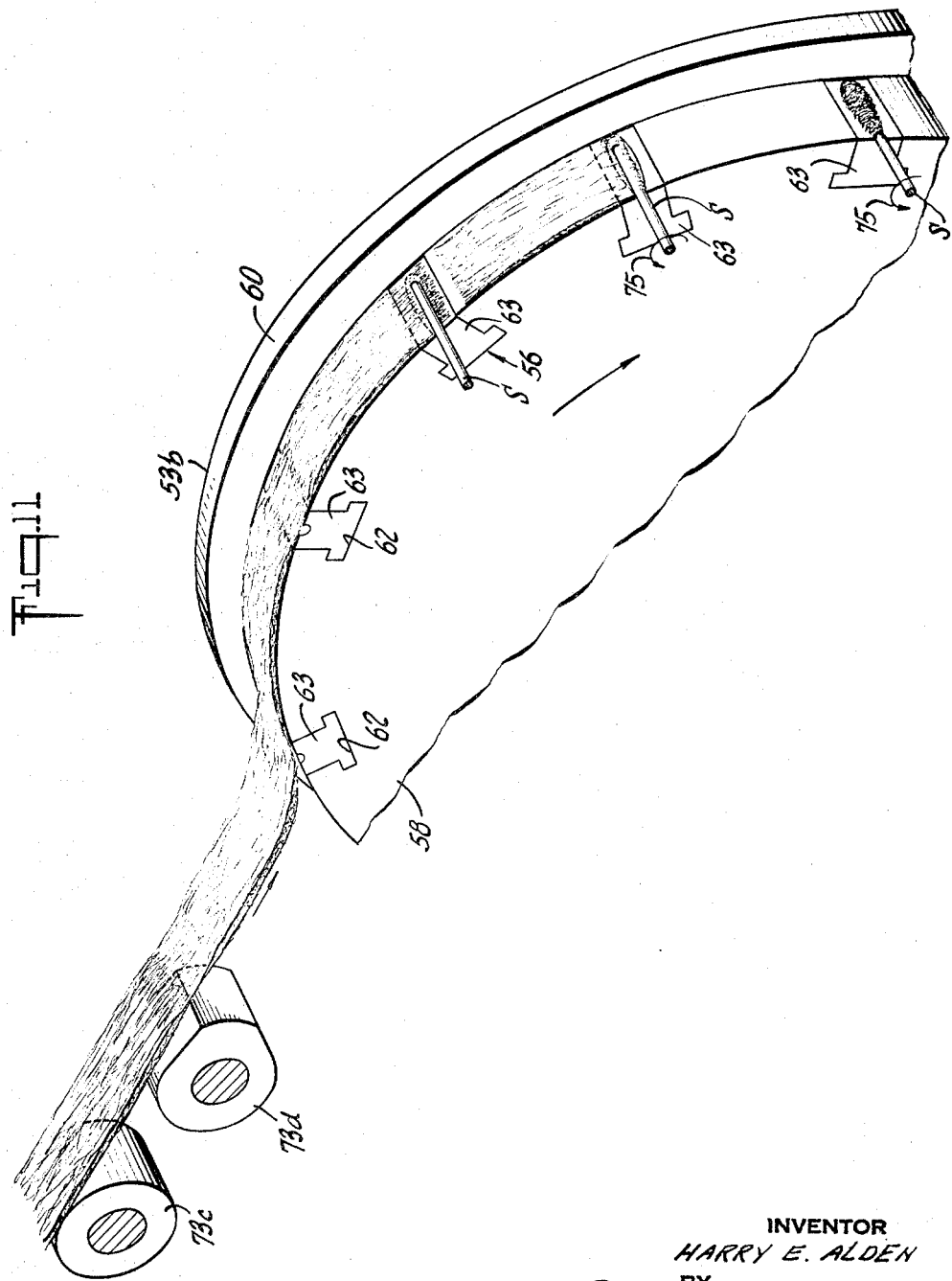

United States Patent Office 3,389,436
Patented June 25, 1968

3,389,436
MACHINES FOR MAKING SWABS
WITH COTTON TIPS
Harry E. Alden, Plainfield, N.J., assignor to Johnson & Johnson, a corporation of New Jersey
Filed July 21, 1964, Ser. No. 384,118
6 Claims. (Cl. 19—145.3)

ABSTRACT OF THE DISCLOSURE

This application discloses a machine for making fibrous tipped swabs. The machine includes a hopper having agitating and gravity relief devices to assure positive and properly aligned delivery of sticks to a rotating pick-up wheel positioned below and adjacent to the hopper delivery throat. From the hopper pick-up wheel the sticks are transported at high speeds through the machine by a series of transfer wheels to a rotating wheel having a plurality of fibrous tip forming stations at equally spaced intervals around its periphery. On this latter wheel the sticks are sequentially introduced to wads of fibrous material at their ends following which the sticks are further sequentially rotated about their longitudinal axis to form the wads into formed fibrous tips on the sticks by tip forming cavities or molds.

Background of the invention

This invention relates to a machine for making swabs and more particularly to a machine of the type wherein small sticks are delivered from a hopper for translation in rapid succession through the machine to a station where a wad of cotton is presented to one or both their ends and the sticks rotated about their longitudinal axes to produce, in conjunction with forming devices, tightly wrapped cotton tips or swabs on such end or ends. The completed product then is delivered from the swab forming mechanism to a device for removal to another station for packaging.

Summary of the invention

In accordance with the invention, a very compact and high speed machine is obtained in which a wheel with closely spaced transverse grooves in its periphery is caused to rotate past the relatively wide mouth of an improved hopper whose parts function to deliver an individual stick quickly and surely into each of the closely spaced transverse grooves so as thereby to isolate the individual sticks for further processing in the machine. The improved hopper contemplates devices which jiggle the sticks as they pass through the hopper to insure their alignment with the fast traveling grooves traversing the hopper mouth and their freedom from interstick jamming so as to permit them to drop into the grooves. The hopper devices in essence contemplates means for relieving the pressure on the sticks at the bottom of the hopper that normally would be exerted upon them by overlying sticks and causing such sticks on which the pressure has been reduced to jiggle somewhat freely thereby to align themselves transversely of the hopper and drop freely from the hopper throat into the high-speed stick conveying wheel.

The sticks are transported through the machine by a motion of translation to a wheel having a plurality of cotton tip forming stations at equally spaced intervals around its periphery. Here the sticks are introduced to wads of cotton which are applied to the sticks at their ends by rotation of the stick in conjunction with a mold having a cavity with the contour of the cotton tip to be formed.

During translation of the sticks through the machine there is provided, in accordance with the invention, an improved mechanism for accelerating their movement so as to increase their relatively narrow spacing upon delivery from the hopper to the comparatively wide spacing they must possess for delivery to the forming wheel at the spacing of the tip forming cavities. For this purpose, a second stick conveying wheel with axis of rotation parallel to that of a first stick conveying wheel having transverse stick carrying recesses with the initial close spacing is located in overlapping relation with the first wheel. The wheel dimensions are such that at the point where their peripheral paths would intersect were they co-planar, the periphery of the second wheel travels radially outwardly from the first wheel. The relative speeds of rotation of the wheels are such that the periphery of the second wheel travels a relatively long interval approximating the desired stick separation during the time the periphery of the first wheel travels the distance from one transverse groove to the next. With the aid of appropriate equipment, each stick is picked out of the transverse groove of the first wheel as it arrives opposite the periphery of the second wheel and at the desired larger spacing of the second wheel. The second stick carrying wheel transports the sticks to another continuously, rotating swab forming wheel where wads of cotton are applied to their ends.

The wads of cotton for application to the sticks are supplied from rovings which pass through a draw frame whose rolls progressively increase in speed to attenuate the cotton and whose last roll is relieved for a substantial portion of its peripheral surface so that only periodically does such roll contact the rovings during their passage through the frame. As the roving is engaged by the unrelieved surface of the last roll it is partially broken into sections of cotton or wads whose lengths are determined by the length around the periphery of the relieved portion of the roll. Later on, the partial break between sections is completed during application of the cotton to the stick and the sectioned length of cotton, when broken, is the wad which is applied to the stick. The partially sectionalized roving is delivered to the continuously rotating swab forming wheel which is provided with individual tip forming recesses located at equally spaced intervals around the wheel, the individual roving sections being delivered in predetermined overlying relationship with respect to the individual tip forming recesses.

A stick is delivered to the swab forming wheel at each forming station in a position overlying the cotton. The stick serves to clamp the cotton in position above the forming cavity until it reaches a point in the travel of the swab forming wheel where it is caused to rotate about its own axis. Upon reaching this point, another roving section and stick will have been delivered at the following swab forming station where the cotton is clamped by the stick so that as the first stick starts to rotate the break between its roving section and the following roving section is completed and the section associated with the rotating stick wound upon the end thereof and formed accordnig to the shape of the forming cavity. Completed swabs are delivered from the swab forming wheel to a transporting device which carries them away for packaging.

A better understanding of the invention may be had from the following description read in conjunction with the accompanying drawings wherein:

FIG. 3 is a developed plan view of part of the machine of FIG. 1, wherein the various operating shafts on which rotatable parts are mounted have been shown as if in a common horizontal plane thus to facilitate an understanding of the construction and operation of the machine;

FIG. 4 is a vertical sectional view on line 4—4 of FIG. 1;

FIG. 5 is a transverse vertical sectional view through a hopper roll for jiggling the sticks;

FIG. 6 is a plan view partly in section of the swab forming wheel;

FIG. 7 is a vertical sectional view on line 7—7 of FIG. 6;

FIG. 8 is a vertical sectional view on line 8—8 of FIG. 6;

FIG. 9 is a partial sectional view on line 9—9 of FIG. 8;

FIG. 10 is a perspective view of a swab forming mold adapted to be inserted in the swab forming wheel at spaced intervals for shaping the cotton tips as they are applied to the ends of the stick; and FIG. 11 is a diagrammatic perspective view of a portion of the swab forming wheel showing the relationship between the stick and the cotton wad at various forming stations in different positions around the wheel.

Figure 1:
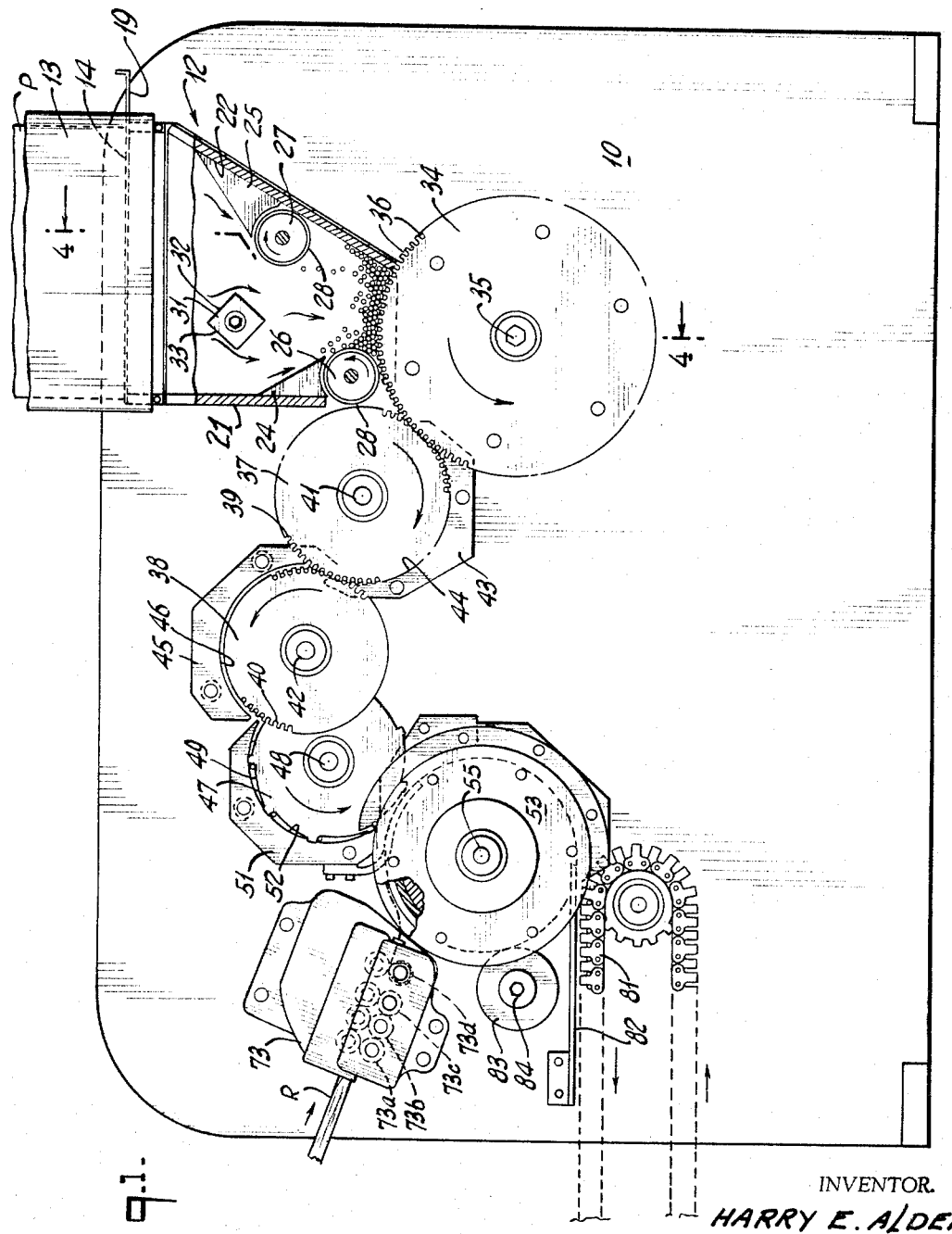
FIG. 1 is a front elevation of a machine equipped with the improvements.

For ease in operation and maintenance, all of the operating parts requiring access are for the most part mounted fore of a vertical front plate 10 which, together with a similar vertical plate 11 spaced to the rear, constitute the fixed main frame members of the machine (FIGS. 1 and 3).

Sticks S to be processed by the machine may be supplied in a package P for location atop a hopper 12 for gravity feed into the machine (FIGS. 1 and 4). To facilitate this operation a rectangular frame 13 with vertical sides and ends and a horizontally movable slide 14 may be fitted over a package of sticks P whose end wall is removed. The package is turned end for end and the frame telescoped over the top of the hopper whose fore-and-aft walls 15 and 16 are recessed to present shoulders 17 and 18 which support the frame 13, at its lower edge. The slide 14 which in this position of the parts is flush with the top of the hopper may then be removed by pulling horizontally on a protruding end 19 thereof provided for the purpose. Removal of the slide permits the sticks which are generally arranged with their longitudinal axes extending in a direction fore and aft of the machine to drop by gravity into the hopper.

The rear wall 15 of the hopper is fixed to the machine frame, member 10 by bolt and spacer devices 20. The hopper has left and right end walls 21, 22 (looking at the machine in FIG. 1) fixed to the rear wall and its front wall 15 is fixed to the end walls in its upper section. The front wall has a lower part 23 hinged at one edge to the right end wall of the hopper to permit opening and closing thereof for access to the interior of the hopper when desired. (FIGS. 1 and 4).

The hopper wall 21 at the left is vertical, whereas the hopper wall 22 at the right slopes downwardly toward the left.

About midway of its height left wall 21 of the hopper is provided with a chute member 24 presenting a surface sloping rather steeply toward the right which acts to direct sticks descending under gravity toward the center of the hopper. The hopper wall 22 at the right also is provided with a chute member 25 presenting a surface sloping toward the left and which tends to direct descending sticks leftward toward the center of the hopper. The chutes 24 and 25 are fixed to the walls which they are respectively associated. Both chute members are concave in their lower surface to accommodate with little clearance, a pair of rolls 26 and 27 extending across the hopper in a fore-and-aft direction for rotation about parallel axes. The roll 26 at the left is located near the bottom of the hopper and defines the left extremity of its throat. The other roll 27 is located about halfway up the sloping wall 22 of the hopper so that the wall 22 per se defines the right extremity of the hopper throat. The cylindrical surfaces of both rotatable rolls 26, 27 are approximately tangent to the sloping surfaces of the respective chute members 24, 25 with which they are associated and at spaced intervals in an axial direction, such rolls are equipped with rubber tires 28 raised somewhat above the cylindrical surfaces thereof (FIGS. 4 and 5). Both rolls 26, 27 are fixed respectively at the front ends of parallel shafts 29, 30 which are journaled for rotation in the front and rear frame members 10 and 11 of the machine, the left roll 26 being rotatable in a counterclockwise direction and the roll 27 in a clockwise direction. Also extending in a fore-and-aft direction from the front to the rear of the hopper is a member 31, presenting top surfaces 32, 33 preferably planar and preferably extending in opposite directions downwardly from a fore-and-aft line of intersection. In the embodiment shown, member 31 is a block square in vertical cross-section, and fixed to the rear wall of the hopper. Block member 31 is located with its diagonal planes disposed respectively in a horizontal and in a vertical direction at a height in the hopper such that its upper surfaces 32, 33 are higher than the roll accommodating surface of the upper chute 25. The function of surfaces 32, 33 will presently appear.

The throat of hopper 12 is closed by the cylindrical surface of a stick conveying wheel 34 fixed on a shaft 35 extending in a fore-and-aft direction and journaled for rotation in the front and rear machine frame members 10 and 11 (FIGS. 1, 3 and 4). The width of the wheel 34, i.e., its dimension in a fore-and-aft direction is such as just to fit between the front and rear walls 15 and 16 of the hopper. The periphery of wheel 34 is formed with transverse recesses 36 large enough in cross section to accommodate a stick S extending lengthwise of its recess and which are spaced as close as possible consistent with dimensions necessary to define, individual recesses for the respective sticks. The throat is relatively long from left to right so that there always will be a substantial number of the transverse recesses in registry with the hopper throat at any given time.

In operation, one stick S is deposited in each recess 36 as wheel 34 rotates across the hopper throat. Were the sticks descending only under the force of gravity as would be the case in the absence of rotating rolls 26 and 27 and fixed block 31, they would tend to jam and bind in the hopper and this would be particularly true if the sticks in their descent are canted in the hopper. Surfaces 32 and 33 of block member 31, however, tend to relieve the pressure on those sticks which pass beneath it on their way to the hopper throat. Furthermore, as rolls 26 and 27 are rotated, respectively in counterclockwise and clockwise direction, those sticks which come in contact with the rolls are lifted upwardly against the force of gravity. This produces a jiggling action on the sticks relieving them of binding pressures from overlying sticks as they approach the throat of the hopper and realigns those sticks which have become canted so as effectively to break up any jams that may have occurred. As a result, the sticks at the mouth of the hopper which are adjacent the wheel 34 as it rotates, readily drop into the transverse recesses 36 thereof and, since any recess in its travel from one end of the hopper throat to the other will have opportunity to contact a relatively large number of sticks, the chances of any given recess being devoid of a stick when it passes beyond the hopper throat are relatively remote. By rotating in a counterclockwise direction as does the stick conveying wheel 34, roll 26 prevents sticks from becoming jammed at the exit end of the throat.

Wheel 34 is the first of a series of stick conveyor wheels by which the individual sticks are transported with a motion of translation through the machine to a wheel on which cotton is applied at the ends of sticks in the form of swabs. The sticks S are transferred from the first wheel 34 to a second wheel 37 and thence to a third wheel 38. The second and third wheels both are equipped with transverse recesses 39 and 40 respectively in which sticks S are carried in the same way as by the first wheel 34. The second and third wheels 37, 38 are fixed at the front ends of parallel shafts 41, 42 journaled for rotation in the front and rear frame members 10 and 11. The shafts 35, 41 and 42 are geared such that the peripheral directions and speeds of the wheels 34, 37 and 38 fixed thereon at the points of tangency of the pitch circles of their transverse recesses coincide. The arrangement just described is obtained by making the second wheel 37 of two circular plates 37a and 37b spaced by a reduced hub portion 37c (FIG. 3). The spacing and dimensions of circular plates 37a, 37b are such that they travel during their rotation in annular grooves 34a and 34b formed in the cylindrical surface of the first wheel 34. Tangency in the pitch circles of the recesses in the second and third wheels 37 and 38 is obtained by forming the recesses in said third wheel 38 in circular plates 38a and 38b spaced by a reduced hub portion 38c and locating the recessed circular plates 38a and 38b for rotation between the recessed plates 37a and 37b of the second wheel 37. Since first wheel 34 rotates in a counterclockwise direction, second wheel 37 in a clockwise direction, and third wheel 38 in a counterclockwise direction, all wheels at the tangency of their recess pitch circles travel in the same direction and since all the wheels have the same peripheral speed, and the same size and spacing of their transverse grooves, appropriate angular adjustment of the wheels about their respective shafts will cause the grooves in each of the tangent wheels to register at their point of tangency.

The sticks being transported in the transverse recesses of wheel 37 are held in place in such recesses by a shoe 43 fixed to the front frame member 10 of the machine below the wheel. The shoe presents an upper surface 44 concentric with the axis of wheel 37 and along which the sticks are guided as such wheel carries them from its point of tangency with wheel 34 to its point of tangency with wheel 38. The clearance between surface 44 and wheel 37 is such as to prevent displacement of the sticks from the transverse recesses in the wheel. Except at the leading end of the shoe where a portion is removed to provide clearance for the body portion of wheel 34 between its annular grooves 34a and 34b (FIG. 1) cylindrical surface 44 is continuous to the trailing end of shoe 43 where it overlaps that stick S which is simultaneously in a recess of both wheels 37, 38 at their point of tangency. The dimensions of shoe 43 permits it to clear between plates 38a and 38b of wheel 38.

A shoe 45 fixed to front frame member 10 presents a cylindrical surface 46 concentric and above wheel 38 and whose clearance therewith is such as to confine the sticks in the grooves of wheel 38 as they travel from the point where the groove pitch lines of wheels 37 and 38 are tangent to a point where they are withdrawn from such grooves as will be described. Shoe 45 is located at its leading end between circular plates 37a and 37b of wheel 37 as is shoe 43 at its trailing end with respect to circular plates 38a and 38b of wheel 38.

At this point in their translatory movement through the machine, sticks S are given a greater spacing along their path of movement to enable their delivery one at a time at appropriately spaced stations on a forming wheel in synchronism with the arrival of a cotton wad at the forming station to be wrapped around the end of the delivered stick (FIG. 1). To this end there is provided a stick spacing wheel 47 fixed on a shaft 48 extending in a fore-and-aft direction and journaled for rotation in the front and rear machine frame members 10 and 11. Wheel 47 comprises spaced parallel circular plates 47a and 47b with an intermediate reduced hub portion 47c. Their spacing is such as to clear them for rotation between spaced parallel plates 38a and 38b of wheel 38. The diameters of the wheels 47 and 38 and the relative location of their shafts 42 and 48 are such that their peripheries cross at right angles. Both wheels rotate in a counterclockwise direction. First wheel 38, in the embodiment illustrated, has seventy-two stick recesses 40 equally spaced about its periphery and accordingly makes one revolution for each seventy-two sticks. Second wheel 47 has nine recesses 49 equally spaced around its periphery so that it makes one revolution for each nine sticks. One ninth of its periphery approximates the distance between wad forming stations as will hereinafter appear.

The leading end of a recess 49 by rotation of wheel 47 is presented in the path of a stick in a given groove 40 of wheel 38 approximately at the point where the stick starts across the outermost circumference of wheel 47. Recess 49 upon rotation of wheel 47 becomes increasingly deeper as it traverses the path of travel of the stick in the given recess so as to accommodate the movement of the latter. Recess 49 presents its greatest depth in the path of travel of the stick in the given recess just as the stick completes its travel of the pitch distance between two recesses in wheel 38. At this point, the continued rotation of wheel 47 presents a shoulder 50 defining the terminal end of recess 49 into engagement with the stick and plucks it out of the given recess without interference. Rotation of wheel 47 from the terminal end of one recess 49 to the leading end of the next recess 49 occurs during the approximate time required for wheel 38 to rotate the thickness of a partition between two adjacent recesses 40. What has just been described occurs with respect to each stick being transported through the machine and since there is a stick in each recess of the wheel 38 there will be a stick in each recess of wheel 47 and these sticks now will be spaced a substantial distance along the periphery of wheel 47 as compared with the distance between recesses 40 in the wheel 38. Sticks S are maintained in the recesses 49 during rotation of wheel 47 by a shoe 51 fixed to front frame member 10 and having a cylindrical guiding surface 52 concentric with wheel 47 and close enough to prevent dislodgment of the sticks from the grooves 49. Surface 52 is wide enough to be effective over substantially the full width between plates 47a and 47b of wheel 47 and long enough to be effective from the position where wheel 47 picks up the sticks to the position where the sticks are discharged therefrom.

Cotton wads are applied to the ends of sticks S on a forming wheel 53 which is illustrated in FIG. 1 and FIGS. 6 to 9 inclusive. Wheel 53 includes two spaced wheel sections 53a and 53b fixed as by keys 54 to a shaft 55 extending in a fore-and-aft direction and journaled for rotation in the front and rear frame members 10, 11 of the machine. There may be twelve forming stations 56 spaced equally around the periphery of wheel 53 which is geared to rotate once for each one and one-third revolution of the spacer wheel 47 which delivers the sticks to it. Stated differently, forming wheel 53 rotates one-twelfth r.p.m. per stick delivered to it as compared with one-ninth r.p.m. per stick of the spacer wheel 47 which delivers the sticks to said wheel.

Each wheel section 53a, 53b, has a hub portion 57 with an outer peripheral marginal portion 58 reduced in both of its faces to accommodate an annular ring 59 located adjacent the inner face of said marginal portion and another annular ring 60 located adjacent the outer face thereof. Annular rings 59 and 60 are fixed to the main wheel sections 53a, 53b by machine screws 61 suitably spaced about the wheel and which pass through the outer annular plates 60 and through the adjacent wheel sections 58 for threading in the inner plates 59. The inner annular rings 59 have an outside diameter somewhat larger than the diameter of the reduced marginal wheel sections 58. The outer annular rings 60 are somewhat larger in diameter and present a beveled edge adjacent the marginal wheel sections 58. This construction provides a channel in each wheel section 53a, 53b, whose base is defined by the peripheral surface of marginal wheel sections 58 and whose walls are defined by the peripheral extensions of annular rings 59 and 60.

At each swab forming station 56 there is a transverse slot 62 in the peripheral edges of the forming wheel sections between the annular rings 59, 60. Each slot may have an outer reduced portion and an inner enlarged portion to accommodate a mold member 63 whose enlarged base section 64 and reduced upper section 65 are dimensioned such as to permit keying into the slots 62 (FIG. 10). The fit may be snug and when all molds are in position they are held against endwise displacement by engagement of their opposite ends by the annular plates 59 and 60. Each mold member 63 presents an outer face approximately flush with the bottom face of the peripheral channels in the wheel sections 53a, 53b and is formed with a mold cavity 66 corresponding in shape to the cotton tip to be formed on the ends of the sticks. The mold cavity has an opening 67 at its inner end in registry with a notch 68 which is formed in the peripheral edge of each annular ring 59 at the forming station. Opening 67 and notch 68 accommodate the stick during the swab forming operation. The forming wheel 53 further includes a flanged hub 69 located between the opposed faces of the wheel sections 53a and 53b, on an anti-friction bearing 70 which encircles the shaft 55, and on which the hub is mounted for free rotation with respect to the shaft. A rim 71 is fixed to this hub adjacent its periphery and is encircled by a rubber tire 72 whose function is to engage and rotate each stick about its longitudinal axis at it reaches a given position during rotation of the forming wheel.

The cotton used in forming the tips on the ends of the sticks is supplied to the machine in the form of a continuous roving R (FIGS. 1 and 11). If the swabs are double tipped, two rovings are used spaced at substantially the same distance as the tips are spaced on the finished swab. The rovings are fed side by side to a draw frame 73 supported on the front frame 10 of the machine and whose operation is well understood. Draw frame 73 is equipped with three pairs of rolls 73a, 73b and 73c which, in well known manner, rotate progressively faster to attenuate the cotton. Draw frame 73 also is equipped with a fourth pair of rolls 73d. The pheripheral surface of the cotton roll of this pair 73d is relieved for a substantial interval around its cylindrical surface and for limited distances along its cylindrical surfaces in line with the rovings so as not to engage the cotton during such interval as it passes between the rolls. At one stage in each rotation of rolls, 73d, however, the cotton is engaged by the unrelieved portion of the bottom roll. This portion of the bottom roll rotates at a speed substantially faster than the speed of rotation of the bottom roll of the pair 73c which immediately proceeds it so that when bottom roll 73d does engage the cotton roving it exerts a sudden and substantial pull upon the roving so as to effect a weakening or a partial break therein but not such a weakening or break as would prevent the roving from continued handling as a unit. In other words, the break is not such as completely to separate the cotton into wads at this point but is such as to cause breakage at the weakened position upon application of additional tension. The speed of operation of the draw frame is such as to deliver the rovings, now in the form of partially detached wads, to the forming wheel 53 in a manner such that each wad is located with a transverse line near its leading end in overlying relation with a forming mold 63 on the forming wheel and the length of each wad is such that there is one wad at each forming station as the forming wheel stations, in their travel, pass beneath the partially broken rovings as they are dispensed by the draw frame.

According to the arrangement just described, each forming station 56, with wads of cotton overlying the mold cavities 66 at such station arrives at a position in the rotation of wheel 53 where spacer wheel 47, deposits a stick S on the forming wheel with its opposite ends overlying such mold cavities and consequently overlying the wads of cotton that in turn overlie the mold cavity. The peripheral speeds of the stick spacer wheel and the swab forming wheel are the same.

Substantially, simultaneously with its delivery at a forming station the stick passes under a concave circular guide 74 concentric with the axis of rotation of the forming wheel 53 and which at its leading end extends between the spaced circular plates 47a, 47b of the spacer wheel 47. Guide 74, in addition to providing for rotation of the stick member about its axis while in contact with its associated wad of cotton in a manner described below, serves initially to transfer the sticks positively from the spacer wheel 47 to their respective positions overlying the forming stations on rotating forming wheel 53. Guide 74 extends around the forming wheel to substantially the lowest point thereof and its width is approximately the same as the width of rubber tired wheel 69 and its concave surface is adjacent the peripheral surface of the wheel. The concave surface of guide 74 preferably is faced with a friction material 75 such as rubber to insure rotation of the stick about its longitudinal axis when simultaneously engaged by the rubber surface of the tired wheel and of the guide.

Initially, however, when a stick enters beneath guide 74 it is held out of engagement with the rubber tired wheel 69 by a rigid finger 76. Finger 76 is located between the rubber surface guide 74 and the rubber tired wheel 69. It follows the curvature of the tired wheel and its width is sufficiently narrow to fit within an annular groove 76a in the peripheral surface of the rubber tire to provide clearance. The finger has a vertical extension 77 at its left end which is fixed to the stick guide 51 to hold the finger in position. Guide 74 is formed with a shallow recess 78 in the portion thereof opposite finger 76 so that all the sticks initially are held clear of the wheel 69.

Since the sticks are initially maintained out of engagement with wheel 69 it is possible, for some reason or other, perhaps an unusually heavy wad of cotton, that the sticks might also be dislodged from the notches 68 in which they are transported by wheel 53. To prevent such an occurrence, additional circular guide plates 79 are disposed in the same vertical planes as the annular rings 59 which present the notches 68 and with their circular edges spaced for clearance from the peripheries of rings 59 with which they are associated. The circular edges are concentric with the annular rings and clearance is provided only to the extent necessary to permit rotation of wheel 53 without interference. The sticks thus are positively held against dislodgment from the notches 68 and in firm contact with the cotton wads underlying the end portion of the sticks. Guide plates 79 are fixed to and supported by guide member 74 in spaced relation with the opposite faces thereof as determined by spacer sleeves 80. The spacing is such as to accommodate circular plates 47a, 47b between such guide plates 79 and guide member 74 during rotation of wheel 47.

When a stick by rotation of its swab forming station reaches the end of finger 76, it rides out of the shallow 78 and into contact with the tire 72 of spinning wheel 69 (FIG. 9). Spinning of the stick commences and cotton wads are wound on the ends thereof. As spinning of a stick is inaugurated the subsequent stick will have moved into engagement with the subsequent wad to anchor the same relatively with respect to its mold cavity (FIG. 11). Spinning serves to wrap the wad about the ends of the stick. This serves to complete the break between it and the subsequent wad which, as previously stated is anchored. Rotation of the stick which is in a counterclockwise direction about its own axis continues throughout the extent of guide plates 79 and guide member 74. This is just beyond the center line of the forming wheel at the bottom at which point the stick may be delivered to a carrier 81 for transportation to a packaging area. A fixed plate 82 which overlies the stick at it leaves the guide constrains its delivery to the carrier. Rubber tired spinning wheel 69 is rotated independently of the forming wheel sections 53a and 53b and its rotation is effected by a driven wheel 83 which frictionally engages its peripheral surface. Wheel 83 whose surface may be rubber coated for increased friction is fixed on a driven shaft 84 extending in a fore-and-aft direction and journaled for rotation in the front and rear frame plates 10 and 11 of the machine. Its speed of rotation may be such as to impart a true rolling motion to the stick along its friction guide surface 75.

Figure 2:
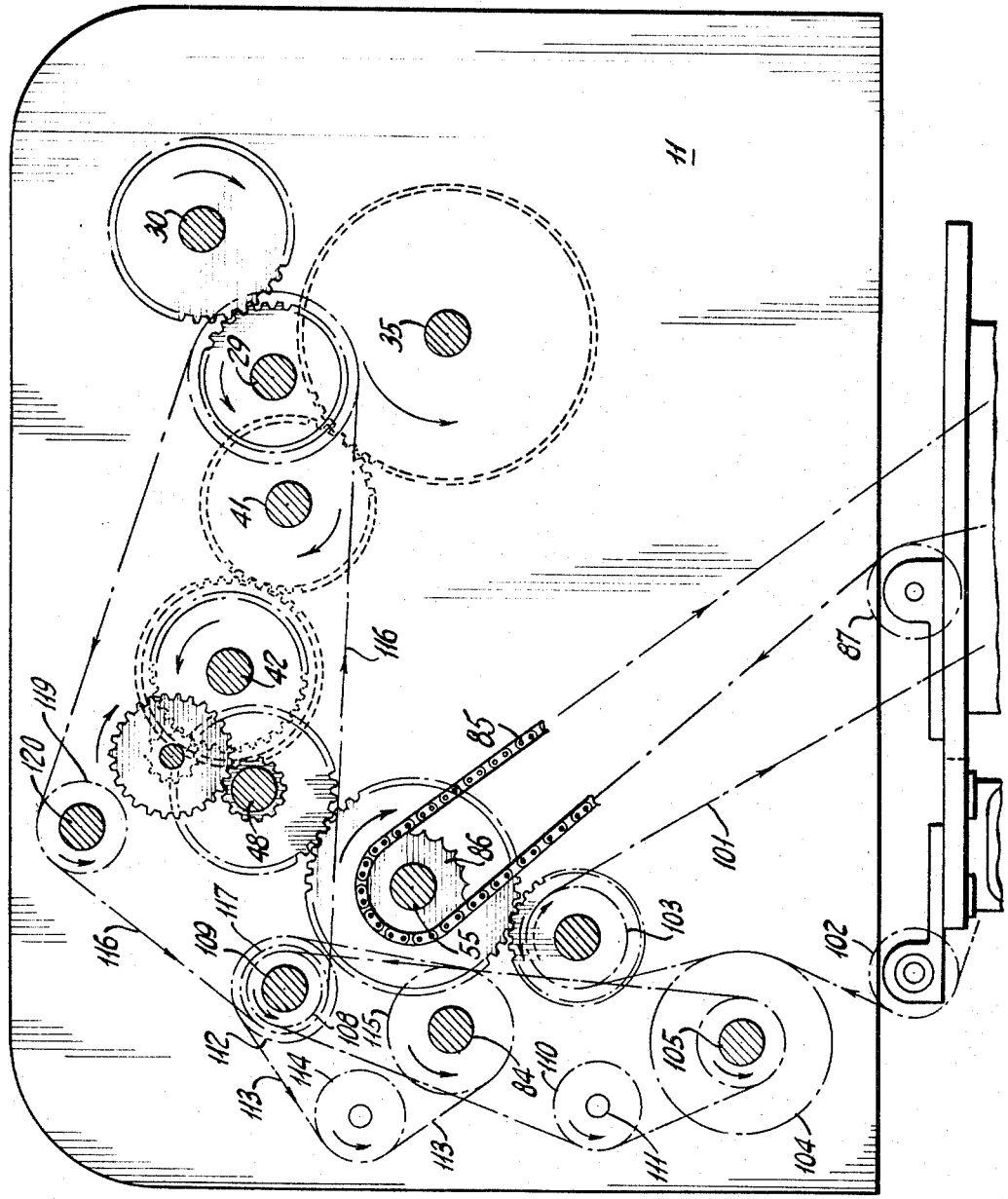
FIG. 2 is a vertical sectional view partly diagrammatic, through the wheel shafts showing the gear and sprocket drives of the various wheels and devices shown in FIG. 1.

Completed swabs are delivered by the machine at the same rate as they are removed from the hopper 12, i.e., at a rate equal to the number of sticks handled per revolution of the wheel 34 which removes the sticks from the hopper, in the period of such revolution. For example, in the embodiment shown there are 120 stick recesses in the periphery of wheel 24. Accordingly 120 sticks are handled per revolution and the wheel turns 1/120 revolution per stick. The two transfer wheels 37 and 38 rotate 1/2 revolution per stick. The stick spacing wheel rotates 1/8 revolution per stick and the swab forming wheel 53 1/12 revolution per stick. The forming wheel 53, the stick spacing wheel 47, and the stick transfer wheels 37 and 38 accordingly rotate respectievly 30, 40 and 5 revolutions for each 3 revolutions of the wheel 34 associated with the hopper. These are relative speeds and may be obtained by appropriately interconnecting the shafts of the mechanisms (FIGS. 2 and 3).

In FIG. 3 the view is "developed" to show the shafts all in one plane thus to simplify understanding of the mechanism. The main drive is through a chain 85 from an appropriately powered gear box (not shown) to a sprocket 86 fixed on shaft 55 which rotates the forming wheel 53. Chain 85 travels over an idler 87 which may be suitably adjusted with respect to the fixed frame of the machine to control its tension. Intermeshing gears 88 and 89 of appropriate sized fixed one on the forming wheel shaft 55 and the other on the stick spacing wheel shaft 48 coordinates their speed of rotation so as to provide the 30 to 40 rotational speed ratio between the swab forming wheel 53 and the stick spacing wheel 47.

Shaft 42 of transfer wheel 38 is driven from shaft 48 of stick spacing wheel 47. The speed of rotation is stepped down in the order of forty to five. This is secured by gears 90 and 91 fixed one on spacing shaft 48 and the other on transfer wheel shaft 42, through intermediate pinions 92, 93 rotatable on a stub shaft 94 which is mounted adjacent the back face of front frame member 10. Shaft 42 of transfer wheel 38, shaft 41 of transfer wheel 37 and shaft 35 of wheel 34 that first receives the sticks from the hopper 12 are all provided with appropriately intermeshing gears 95, 96, 97 arranged respectively on such shafts adjacent to and at the rear of frame member 11 to insure the relative speeds between such wheels as previously described.

The conveyor chain 81 for carrying finished swabs from the forming wheel 53 is driven and supported by a sprocket 98 fixed at the front end of a fore-and-aft shaft 99 which is journaled in the front and rear frame members 10, 11 and it too has a gear 100 fixed thereon which meshes with and is driven through gear 88 on forming wheel shaft 55 previously referred to.

The rest of the actuated parts are for the most part chain driven because of their spaced positions in the machine. Thus, a chain 101 from the gear box of the main drive (not shown) travels around a tension adjusting sprocket 102 and over an idler sprocket 103 rotatably mounted on the conveyor drive shaft 99. Chain 101 which travels in a clockwise direction engages with its outside a sprocket 104 fixed on a fore-and-aft shaft 105 journaled at its opposite ends in the front and rear frame members 10 and 11. Shaft 105 is driven in a counterclockwise direction. From another sprocket 106 fixed on shaft 105 there is another chain 107 which drives upwardly in a counterclockwise direction around a sprocket 108 fixed on a fore-and-aft shaft 109 and also around idler sprocket 110 rotatable on stub shaft 111 to give clearance around the parts. Stub shaft 111 is not shown on FIG. 3. Shaft 109 through another sprocket 112 fixed thereon drives a chain 113 clockwise around a sprocket 114 to drive the draw frame and also around a sprocket 115 fixed on shaft 84 which supports wheel 83 for rotating the stick spinning wheel 69.

Finally a chain 116 from another sprocket 117 on shaft 109 passes in a counterclockwise direction around a sprocket 118 on shaft 29 of hopper wheel 26 which also rotates in a counterclockwise direction and then over an idler sprocket 119 on a stub shaft 120 supported for rotation in the rear frame member 11 of the machine (not shown) and back to drive sprocket 117. Idler sprocket 119 enables chain 116 to clear all intervening shafts. A gear 121 fixed on shaft 29 of left hand hopper wheel 26 meshes directly with a similar sized gear 122 fixed on shaft 30 of right hand hopper wheel 28 which, as will be recalled, is rotated in a clockwise direction. All gears and sprocket sizes are appropriately designed to give speeds of rotation necessary for the performance of the functions described. The machine described is simple, economical to build and capable of high speed operation. It is believed its operation will be clear from what has been said.

The invention has been described in connection with one embodiment thereof which is a preferred embodiment but many modifications thereof are included within its spirit. It is to be limited therefore only by the scope of the appended claims.

What is claimed is:

1. A swab forming machine comprising, in combination, a rotatable conveyer wheel presenting a plurality of swab forming cavities spaced equally about the periphery of said wheel, means for delivering fibrous wads partially broken one from the other in overlying relation with each of said cavitives, means for delivering sticks to each of said cavities with their ends in overlying engagement with said wabs, a sticking rotating device, means for maintaining each delivered stick out of engagement with said stick rotating device during its initial travel in engagement with a wad and means for bringing each stick into engagement with said stick rotating device during its subsequent travel with said wad when a subsequent stick is in the initial stages of travel with its associate wad whereby the wads are completely broken one from the other and one wad wrapped around the stick during its subsequent travel.

2. A swab forming machine comprising in combination, a rotatable conveyer wheel presenting a plurality of swab forming cavities spaced equally about the periphery of said wheel, means for delivering fibrous wads partially broken one from the other in overlying relation with said cavities, a rotatable stick carrying wheel having spaced stick carrying recesses located adjacent the rotatable conveyer wheel and timed to present a stick at a given position each time a swab forming cavity with overlying fibrous wad is presented at said given position, means for transferring sticks from the stick carrying wheel to the rotatable conveyer wheel upon their arrival at said given position and with an end of the sticks in overlying engagement with the fibrous wads, a stick rotating device, means for maintaining each stick at said given position out of engagement with said stick rotating device, means for bringing each stick into engagement with said stick rotating device during its subsequent travel beyond said given position, and means for forcing the ends of said sticks against the wads associated therewith at said given position to anchor the wads to the rotatable conveyer wheel when the sticks are out of engagement with said stick rotating device whereby the wad associated with a stick that is engaged with the stick rotating device is rotated; and is completely broken from the other wads and wrapped around its associated stick.

3. A swab forming machine comprising in combination, a conveyer wheel presenting a plurality of swab forming cavities spaced equally about the periphery of said wheel, means for delivering fibrous wads partially broken one from the other in overlying relation with said cavities, a rotatable stick carrying wheel having spaced stick carrying recesses, located adjacent the rotatable conveyer wheel and timed to present a stick at a given position each time a swab forming cavity with overlying fibrous wad is presented at said given position, means for transferring the sticks from the stick carrying wheel to the rotatable conveyer wheel upon their arrival at said given position and with the sticks in overlying engagement with the fibrous wads, a stick rotating wheel arranged adjacent the conveyer wheel, means presenting a surface adjacent the stick rotating wheel between and in contact with which stick rotating wheel and surface the sticks are rotated, and means for holding the sticks out of engagement with the stick rotating wheel during the initial phase of its movement after transfer to the rotatable conveyer wheel.

4. A swab forming machine comprising, in combination, a rotatable conveyer wheel presenting a plurality of swab forming cavities spaced equally about the periphery of said wheel, means for delivering fibrous wads partially broken one from the other in overlying relation with said cavities, a rotatable stick carrying wheel having spaced stick carrying recesses, located adjacent the rotatable conveyer wheel and timed to present a stick at a given position each time a swab forming cavity with overlying fibrous wad is presented at said given position, means for transferring sticks from the stick carrying wheel to the rotatable conveyer wheel upon their arrival at said given position and with the sticks in overlying engagement with the fibrous wads, a frictioned surface stick rotating wheel arranged adjacent the conveyer wheel, means presenting a surface adjacent the stick rotating wheel between and in contact with which stick rotating wheel and surface the sticks are rotated, a circumferential peripheral groove in the stick rotating wheel, and means within said groove for holding the sticks out of engagement with the stick rotating wheel during the initial phase of its movement after transfer to the rotatable conveyer wheel.

5. A swab forming machine comprising, in combination, a conveyer presenting a plurality of swab forming cavities movable along its line of travel, means for delivering fibrous wads partially broken one from the other at the respective moving swab forming cavities, means for delivering, in sequence, individual sticks to each of the respective moving cavities as they pass a given point, each of said sticks being delivered to its respective swab forming cavity with an end thereof in contact with the wad at its cavity, and means for forcing the end of each of said sticks against the wad at its respective swab forming cavity to anchor the wad to said conveyer at said given point, and means for rotating a previously delivered stick about its longitudinal axis at a position forward of said given delivery point on said conveyer whereby the fibrous wads are completely broken one from the other and the wad at said forward position is wrapped around its stick.

6. A swab forming machine according to claim 5 wherein there are provided means for maintaining said sticks out of engagement with said stick rotating means at said given delivery point and means for bringing said sticks into engagement with said stick rotating means at a position forward of said given delivery point.

References Cited

UNITED STATES PATENTS

| | | | |
|---|---|---|---|
| 2,430,648 | 11/1947 | Schonrock | 19—149 |
| 2,576,068 | 11/1951 | Ganz | 19—149 |
| 2,618,027 | 11/1952 | Barber et al. | 19—145.3 |
| 3,090,080 | 5/1963 | Pellicone et al. | 19—145.3 |
| 3,104,752 | 9/1963 | Rudszinat et al. | 198—211 X |

DORSEY NEWTON, *Primary Examiner.*

UNITED STATES PATENT OFFICE
CERTIFICATE OF CORRECTION

Patent No. 3,389,436                                  June 25, 1968

Harry E. Alden

It is certified that error appears in the above identified patent and that said Letters Patent are hereby corrected as shown below:

Column 2, line 59, "accordnig" should read -- according --; line 67, before "improvements" insert -- present --. Column 3, line 70, before "which" insert -- with --. Column 7, line 47, "pheripheral" should read -- peripheral --; line 48, "cotton" should read -- bottom --; line 62, "handling" should read -- handled --. Column 9, line 5, "at" should read -- as --; line 23, "24" should read -- 34 --. Column 10, line 46, "wabs, a sticking" should read -- wads, a stick --.

Signed and sealed this 18th day of November 1969.

(SEAL)

Attest:

Edward M. Fletcher, Jr.                        WILLIAM E. SCHUYLER, JR.

Attesting Officer                                 Commissioner of Patents